(12) United States Patent
Choudhury et al.

(10) Patent No.: US 10,387,447 B2
(45) Date of Patent: Aug. 20, 2019

(54) DATABASE SNAPSHOTS

(71) Applicant: Oracle International Corporation, Redwood Shores, CA (US)

(72) Inventors: Nilesh Choudhury, Redwood City, CA (US); Scott Martin, Sunnyvale, CA (US); Zuoyu Tao, Belmont, CA (US); Jia Shi, Burlingame, CA (US); Alexander Tsukerman, Foster City, CA (US); Kothanda Umamageswaran, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 453 days.

(21) Appl. No.: 14/823,212

(22) Filed: Aug. 11, 2015

(65) Prior Publication Data

US 2016/0092534 A1    Mar. 31, 2016

Related U.S. Application Data

(60) Provisional application No. 62/055,529, filed on Sep. 25, 2014.

(51) Int. Cl.
  *G06F 16/27* (2019.01)
  *G06F 11/14* (2006.01)
  *G06F 3/06* (2006.01)

(52) U.S. Cl.
  CPC ............ *G06F 16/27* (2019.01); *G06F 3/0608* (2013.01); *G06F 3/0617* (2013.01); *G06F 11/1435* (2013.01); *G06F 11/1458* (2013.01)

(58) Field of Classification Search
  CPC combination set(s) only.
  See application file for complete search history.

(56) References Cited

U.S. PATENT DOCUMENTS 5,564,037 A * 10/1996 Lam ..................... G06F 3/0608
                                                          707/999.202
7,475,098 B2    1/2009 Patterson
(Continued)

OTHER PUBLICATIONS

Warden, Tim, "Storage Pooling, Thin Povisioning and Over-Subscription"., Las Solanas Consulting, dated Jul. 3, 2010, www.las-solanas.com storage_virtualization/thin_provisioning.php>, 4 pages.
Walrond, Dan, "Using Netcat and Tar to Quickly Transfer Files Between Machines, AKA Tar Pipe", N.D. Accessed dated Oct. 19, 2017, web.archive.org/web/20130925161957/http://toast.djw.org, 9 pgs.
(Continued)

*Primary Examiner* — Etienne P Leroux
(74) *Attorney, Agent, or Firm* — Hickman Palermo Becker Bingham LLP (57) ABSTRACT

Techniques herein are for creating a database snapshot by creating a sparse database. A method involves receiving a creation request to create a sparse database. The creation request has an identity of a parent database. The creation request is processed to create a sparse database. The sparse database has the identity of the parent database. The sparse database does not contain data copied from the parent database. A write request to write data into the sparse database is received. The write request is processed by writing the data into the sparse database. The parent database does not receive the data.

22 Claims, 9 Drawing Sheets

DATABASE SYSTEM 100

(56) References Cited

U.S. PATENT DOCUMENTS

| | | | |
|---|---|---|---|
| 9,239,869 | B1 | 1/2016 | Zhang |
| 9,575,849 | B2 | 2/2017 | Mittal |
| 2003/0074492 | A1 | 4/2003 | Cochran |
| 2003/0158863 | A1* | 8/2003 | Haskin ................ G06F 11/1435 |
| 2004/0267835 | A1* | 12/2004 | Zwilling ............. G06F 11/1451 |
| 2004/0268068 | A1 | 12/2004 | Curran |
| 2005/0246397 | A1 | 11/2005 | Edwards |
| 2006/0179261 | A1 | 8/2006 | Rajan |
| 2006/0206536 | A1* | 9/2006 | Sawdon ............... G06F 11/1435 |
| 2008/0072003 | A1* | 3/2008 | Vu ......................... G06F 3/0617 711/162 |
| 2008/0162491 | A1 | 7/2008 | Becker |
| 2008/0244028 | A1 | 10/2008 | Le |
| 2010/0250499 | A1 | 9/2010 | McAlister |
| 2011/0191296 | A1 | 8/2011 | Wall |
| 2011/0307447 | A1 | 12/2011 | Sabaa |
| 2012/0017060 | A1* | 1/2012 | Kapanipathi ......... G06F 3/0608 711/162 |
| 2012/0278799 | A1* | 11/2012 | Starks .................... G06F 9/455 718/1 |
| 2013/0054531 | A1 | 2/2013 | Susairaj et al. |
| 2013/0103644 | A1 | 4/2013 | Shoens et al. |
| 2013/0212068 | A1* | 8/2013 | Talius ............... G06F 17/30088 707/639 |
| 2013/0297722 | A1 | 11/2013 | Wright |
| 2014/0006354 | A1 | 1/2014 | Parkison |
| 2014/0258239 | A1 | 9/2014 | Amlekar |
| 2015/0019909 | A1* | 1/2015 | Griffith ............... G06F 11/1458 714/15 |
| 2015/0120780 | A1 | 4/2015 | Jain |
| 2015/0254240 | A1 | 9/2015 | Li |
| 2015/0370641 | A1 | 12/2015 | Susairaj et al. |
| 2016/0110292 | A1 | 4/2016 | Choi |
| 2016/0171029 | A1 | 6/2016 | Sanvido |

OTHER PUBLICATIONS

Haynes, T. "Network File System (NFS) Verison 4 Minor Version 2 Protocol", IERF Tools, dated May 17, 2014, from <tools.ietf.org/html/draft-ietf-nfsv4-minorversion2-24>, 8 pages.

Free Software Foundation, Inc., "GNU Tar: An Archiver Tool", dated Sep. 24, 2013, www.gnu.org/software/tar/manual/html_node/index.html_ 6 pages.

Susairaj, U.S. Appl. No. 14/313,926, filed Jun. 24, 2014, Office Action, dated Nov. 2, 2017.

Susauraj, U.S. Appl. No. 14/313,926, filed Jun. 24, 2014, Office Action, dated Feb. 23, 2017.

Tao, U.S. Appl. No. 14/849,012, filed Sep. 9, 2015, Office Action, dated Dec. 11, 2017.

Tao, U.S. Appl. No. 14/849,012, filed Sep. 9, 2015, Advisory Action, dated Nov. 21, 2018.

Susairaj, U.S. Appl. No. 15/266,340, filed Sep. 15, 2016, Interview Summary, dated Jan. 3, 2019.

Susairaj, U.S. Appl. No. 15/226,340, filed Sep. 15, 2016, Office Action, dated Oct. 30, 2018.

Tao, U.S. Appl. No. 14/849,012, filed Sep. 9, 2015, Interview Summary, dated May 3, 2018.

* cited by examiner

202 Receive creation request to create sparse database
Creation request has identity of parent database 204 Process creation request to create sparse database
Sparse database has identity of parent database
Sparse database does not contain data copied from parent database 206 Receive write request to write data into sparse database 208 Process write request by writing data into sparse database
Parent database does not receive this data

ABASE SNAPSHOTS

CROSS-REFERENCE TO RELATED APPLICATIONS; BENEFIT CLAIM

This application claims the benefit of U.S. Provisional Application No. 62/055,529 entitled Database Snapshots, filed Sep. 25, 2014, the contents of which are incorporated by reference for all purposes as if fully set forth herein.

TECHNICAL FIELD

Embodiments relate generally to techniques for creating database snapshots. Specific techniques are included that use a sparse database backed by an existing database to implement a database snapshot.

BACKGROUND

Data isolation is a common problem with the software development lifecycle. Architects, developers, testers, and administrators need to tinker, enhance, and validate while using realistic data. However, they do not want to share a database with each other because incompatible or unexpected changes by coworkers may cause instability. Furthermore, a production system should not be interfered with for engineering that is unrelated to production.

Consequently, engineers copy a production database to create experimental database snapshots for various purposes. However, copying a database has other problems. For example, copying in progress can stress resources associated with an original database. Database copying entails deep copying of all data within a database. Deep copying is time consuming. Each copy consumes as much storage space as the original, which is aggravated by demand for additional copies.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
 1.0 General Overview
 2.0 Implementing A Database Snapshot With A Sparse Database
  2.1 Sparse Pattern for Non-Materialized Blocks
  2.2 Orthogonality of Storage Systems
 3.0 Database Snapshot Creation Process
 4.0 Daisy Chained Sparse Snapshots
 5.0 Shallow Snapshot
 6.0 Deep Snapshot
 7.0 Smart Scan Of Snapshot
 8.0 Live Master Database, Slave On Hot Standby, Replication Synchronization, High Availability Pair, Buddy Failover
 9.0 Thin Provisioning
 10.0 Hardware Overview
 11.0 Extensions and Alternatives
1.0. General Overview Techniques are described herein for creating a database snapshot by creating a sparse database. In an embodiment, a database system receives a request to create a database snapshot. The request includes an identifier of an existing parent database. The computer creates a sparse database that is initially empty, except for metadata. The computer copies the identifier of the parent database into the metadata of the sparse database. The sparse database has data files, some or all of which may be sparse files that are backed by data files of the parent database.

The computer subsequently receives and process requests to read and write data that involve the database snapshot. Write requests are handled by updating only the sparse database and its data files. Depending on which blocks of which data files are implicated, a read request may retrieve data stored in the data files of the sparse database, in the data files of the parent database, or some combination thereof.

In an embodiment, a sparse database may function as a database snapshot and as a parent database of another database snapshot. This enables daisy chaining of multiple sparse databases.

In an embodiment, a database snapshot may function as a replication slave on hot standby.

2.0 Implementing a Database Snapshot with a Sparse Database

Figure 1A:
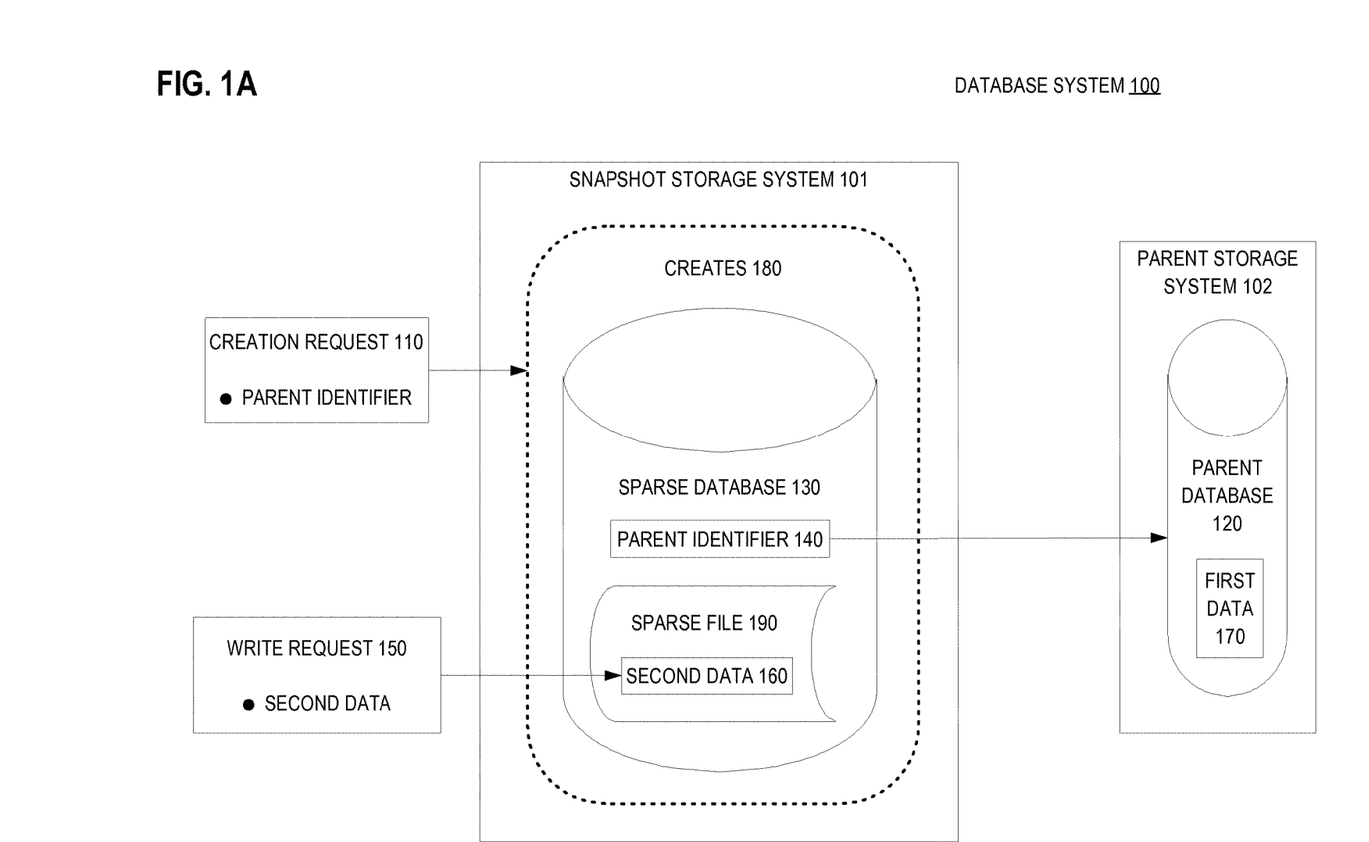
FIG. 1A is a logical block diagram illustrating an example sparse snapshot system in which certain techniques described herein may be implemented, according to various embodiments.

FIG. 1A illustrates a block diagram of example database system 100 that creates a sparse database to implement a database snapshot, in which techniques described herein may be practiced. Database system 100 comprises snapshot storage system 101 and parent storage system 102. Storage systems 101-102 may each comprise a set of storage devices, each of which comprise disk or tape drives or a flash memory or other non-volatile memory.

A storage device is a block mode device. A block mode device provides a client access to data in units referred to as a data block. A data block is the atomic unit of data from primary storage that a storage device client may request from a storage device.

Each storage device has a logical address space that identifies a range of data blocks. The logical address space has logical block addresses that may reference more data blocks than the storage device can actually store. The address spaces of storage systems 101-102 may be unrelated, such that a given logical block address may be within the address spaces of one or both of storage systems 101-102.

A logical block address may be part of a virtual block address in an address space that spans multiple storage devices and perhaps multiple storage systems. A virtual block address may have an identifier of a storage device or storage system. Depending on the implementation, any of storage systems 101-102 and database system 100 may use virtual block addresses, logical block addresses, or both. Database system 100 may have an address translation layer, such as an associative array, that maps a virtual block address to a logical block address on a particular storage device.

Storage systems 101-102 may be separate storage systems or one and the same storage system. Parent storage system 102 includes parent database 120, which may be any online database, such as a relational database, a NoSQL database, a tuple store, or a graph database.

In operation, database system 100 receives creation request 110 to create a sparse database snapshot within snapshot storage system 101. Creation request 110 may originate from within database system 100 or from an external source. Creation request 110 may be generated by an ad hoc query tool, a command shell, or other program.

Creation request 110 includes the identity of an existing database, such as parent database 120, from which a snapshot is to be created. An embodiment of storage system 100 may create a snapshot database by copying data files of parent database 120, as with traditional creation of a snapshot.

Traditional snapshot creation may be intensive in the time or the space of a storage device, especially if parent database 120 is immense. Furthermore, storage systems 101-102 may be geographically far from each other and perhaps involving a wide area network (WAN), such as the global Internet. When creating a traditional snapshot, geographic separation may impose excessive spending of time or money on network transport.

However, database system 100 does not necessarily copy data files to create a snapshot. Instead, database system 100 creates a sparse database that initially contains only metadata and is otherwise empty. Creating a sparse database entails database system 100 creating within storage system 101, the files of sparse database 130, such as sparse file 190. Creating sparse database 130 and its sparse files is fast and can be done in constant time, regardless of the size of parent database 120. This is shown as creates 180, which constructs sparse database 130.

During snapshot creation, database system 100 copies the parent database identity from creation request 110 into the metadata of sparse database 130. Although initially empty, sparse database 130 may operate as a database snapshot. Database system 100 may try to retrieve data from sparse database 130 while it is empty. The read would not be fulfilled, and database system 100 may compensate by retrying the read from parent database 120 instead.

Sparse database 130 includes data files that are composed of data blocks. Among the data files of sparse database 130 are one or more sparse files, such as sparse file 190. Sparse file 190 may contain a mix of materialized and non-materialized blocks. A materialized block has actual data in physical storage.

A non-materialized block has a logical block address, but no corresponding physical storage. Database system 100 may cause an associative array to associate a non-materialized sparse block of sparse file 190 with a materialized block of parent file 120 that is either a sparse or ordinary file. Database system 100 may reference the associative array should a read of sparse file 190 go unfulfilled and need retrying with parent database 120.

2.1 Sparse Pattern for Non-Materialized Blocks

Figure 1B:
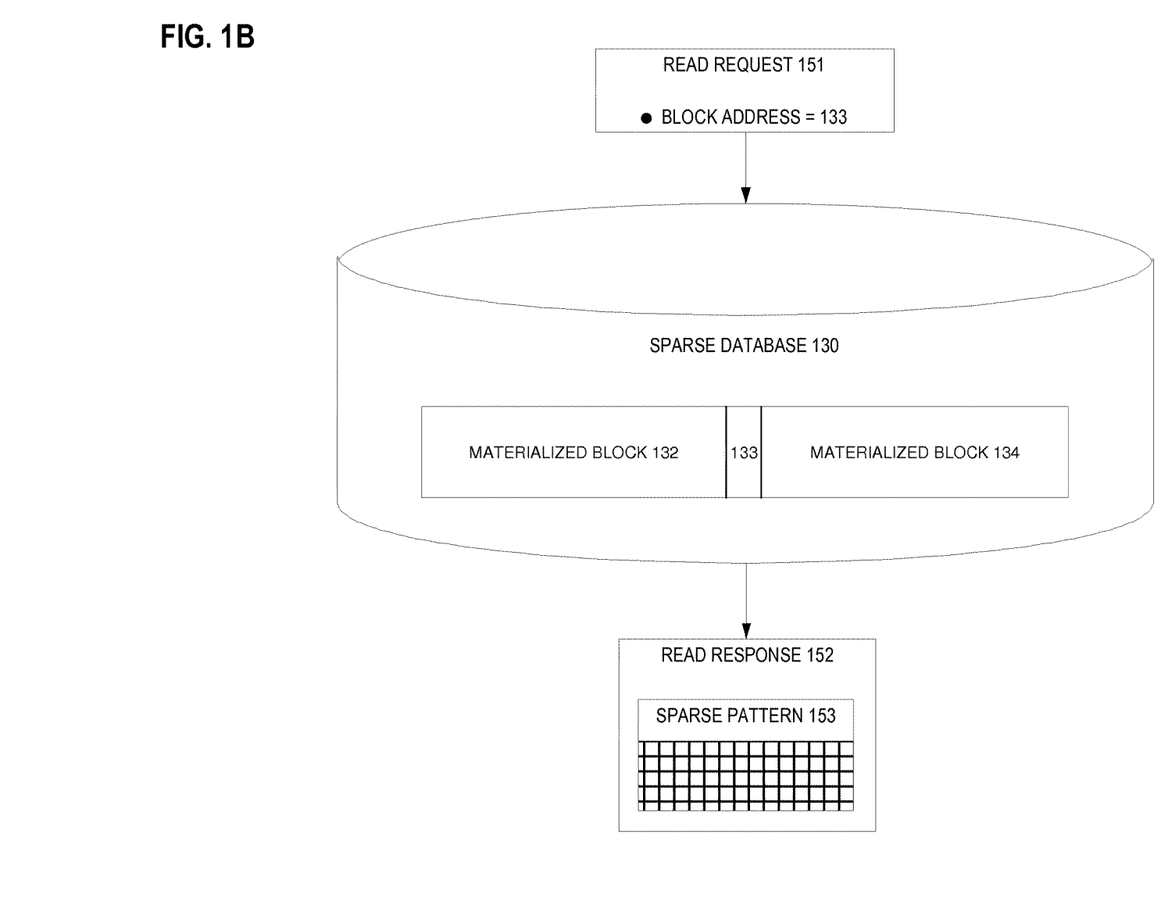
FIG. 1B is a logical block diagram illustrating an example sparse database in which certain techniques described herein may be implemented, according to various embodiments.

Example mechanics of reading a non-materialized block are shown in FIG. 1B. Referring to FIG. 1B, sparse database 130 includes materialized blocks 132 and 134 and non-materialized block 133 in sparse file 190 (not shown). As block 133 is non-materialized in sparse database 130, block 133 is materialized in a file of the parent database.

To request a data block in sparse database 131, the database system 100 "speculatively" sends a read request for the data block to snapshot storage system 101, specifying the logical address of the data block. The read request is referred to herein as being performed speculatively because, at this stage, database system 101 may be unaware of whether or not the data block is materialized within snapshot storage system 101. If the data block is non-materialized, snapshot storage system 101 responds to the request by returning with a data block containing a sparse pattern. Database system 101 reacts to the sparse pattern by issuing a read to parent storage system 102 for the data block.

Read response 152 includes sparse pattern 153 that indicates the retrieved block 133 is sparse and so lacks data. The database server system recognizes sparse pattern 153 in read response 152 and reacts by reissuing read request 151 to the parent database. Instead of sparse pattern 153, read response 152 may have a header field that indicates the retrieved block is sparse and so lacks data.

2.2 Orthogonality of Storage Systems

A consequence of a speculative read of a non-materialized block of sparse file 190 is that storage systems 101-102 not need to have a sophisticated file system that supports the backing of sparse file 190 by a parent file. For example, storage systems 101-102 might not be the same storage system and might not interact with each other. It is database system 100 itself that manages this separation. Such architectural separation of sparse file 190 and its backing parent file enable database system 100 to use storage systems that do not directly support a dependency on a backing file.

Furthermore, this separation enables database system 100 to achieve environmental or capacity separation between sparse database 130 and parent database 120. Environmental separation may involve keeping sparse database 130 and parent database 120 on completely separate storage systems. For example, parent storage system 102 may be production storage. While, snapshot storage system 101 may be development storage. Whereas if storage systems 101-102 are one and the same, capacity separation requires only separate file systems for sparse database 130 and parent database 120, such that they do not necessarily compete with each other for storage space.

Separation of sparse database 130 and parent database 120 enables diversity of quality of service (QoS). For example sparse database 130 and parent database 120 may occupy different storage tiers that offer different QoS. Parent database 120 may be assigned storage that offers high capacity, regular backups, high security, and redundancy for high availability. Whereas sparse database 130 may be assigned storage that is simple, inexpensive, and locally administered. Furthermore if availability is not a priority, sparse database 130 may reside on a laptop of an engineer or even on removable media. Indeed, the small size that is typical of sparse database 130 may enable its files to be readily attached to an email or trouble ticket.

For example, parent database 120 may have first data 170 in one or more materialized blocks of an ordinary file. Sparse database 130 instead has sparse file 190 that is backed by the ordinary file. Sparse file 190 may have the same logical block addresses as the materialized blocks that contain first data 170. However in sparse file 190, these block addresses refer to non-materialized blocks. As such, sparse database 130 does not contain first data 170.

Although not shown, sparse database 130 may receive a request to read first data 170. However, because first data 170 resides only in parent database 120, database system 100 retries, on parent database 120, the reading of the logical block addresses of first data 170.

Database system 100 also receives write request 150 to store a second data. Unlike reads, writes to sparse database 130 are not speculative and are not retried on parent database 120. Database system 100 executes write request 150 by copying second data 160 from write request 150 into sparse file 190 of sparse database 130.

Although not shown, sparse database 130 may receive a request to together read both of first data 170 and second data 160. Database system 100 handles this request by retrieving data from both of sparse database 130 and parent database 120.

3.0 Database Snapshot Creation Process

Figure 2:
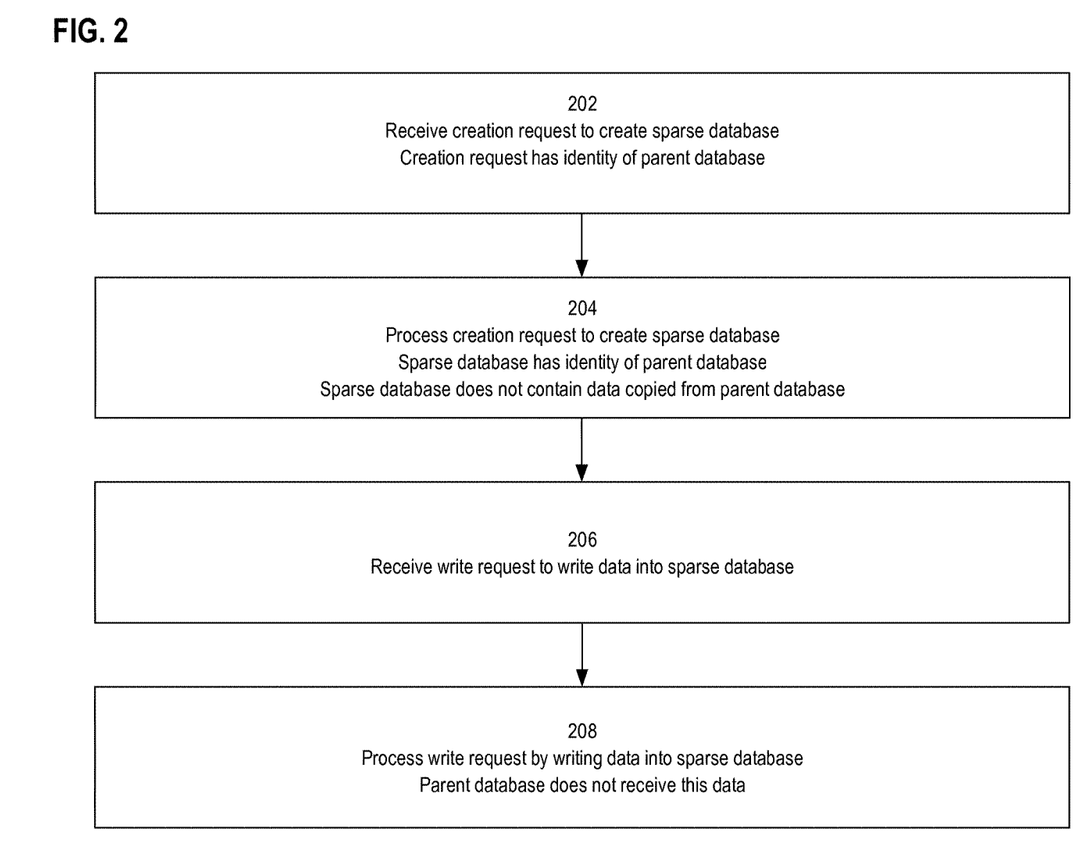
FIG. 2 illustrates an example process for creating a database snapshot, according to an embodiment.

FIG. 2 depicts a flow diagram of an example process for creating a database snapshot. For illustrative purposes, FIG. 2 is discussed in relation to FIG. 1.

Step 202 is preparatory. In step 202, a computer receives a request to create a sparse database. The request bears an identifier of a parent database. For example, creation request 110 may be a data definition language (DDL) command issued by a DDL script or an ad hoc query tool command that has arguments for creation parameters such as a proposed identifier of sparse database 130 and an identifier of the parent database 120. Alternatively, creation request 110 may be a shell command with appropriate command line arguments.

Database system 100 may have a data dictionary, a metadata repository, a catalog, or other metadata store. Database system 100 may update the data dictionary to record details, such as given in the DDL, that logically define sparse database 130 as a snapshot of parent database 120.

In step 204, the computer creates a sparse database by processing the creation request. For example, database system 100 may verify that the parent identifier within creation request 110 corresponds with an existing database. An embodiment of database system 100 may reject creation request 110 if parent database 120 is not read only. An embodiment of database system 100 may automatically cause parent database 120 to become read only while processing creation request 110.

Successful execution of creation request 110 results in the creation of sparse database 130. Database system 100 copies parent identifier 140 from creation request 110 into metadata of sparse database 130. Sparse database 130 may be initially empty, except for metadata.

In step 206, a computer receives a request to write data into the sparse database. For example, database system 100 receives write request 150 that bears second data. Write request 150 may come from a transaction of an online transaction processing (OLTP) system, an ad hoc query tool, a data manipulation language (DML) script, or other database client.

In step 208, the data is stored in the sparse database. For example, database system 100 copies second data 160 from write request 150 into sparse database 130. Updating existing data likely reuses available blocks of the data files of sparse database 130. However, inserting new data may require additional blocks, which may cause non-materialized blocks within sparse file 190 to become materialized.

4.0 Thin Provisioning

Figure 3:
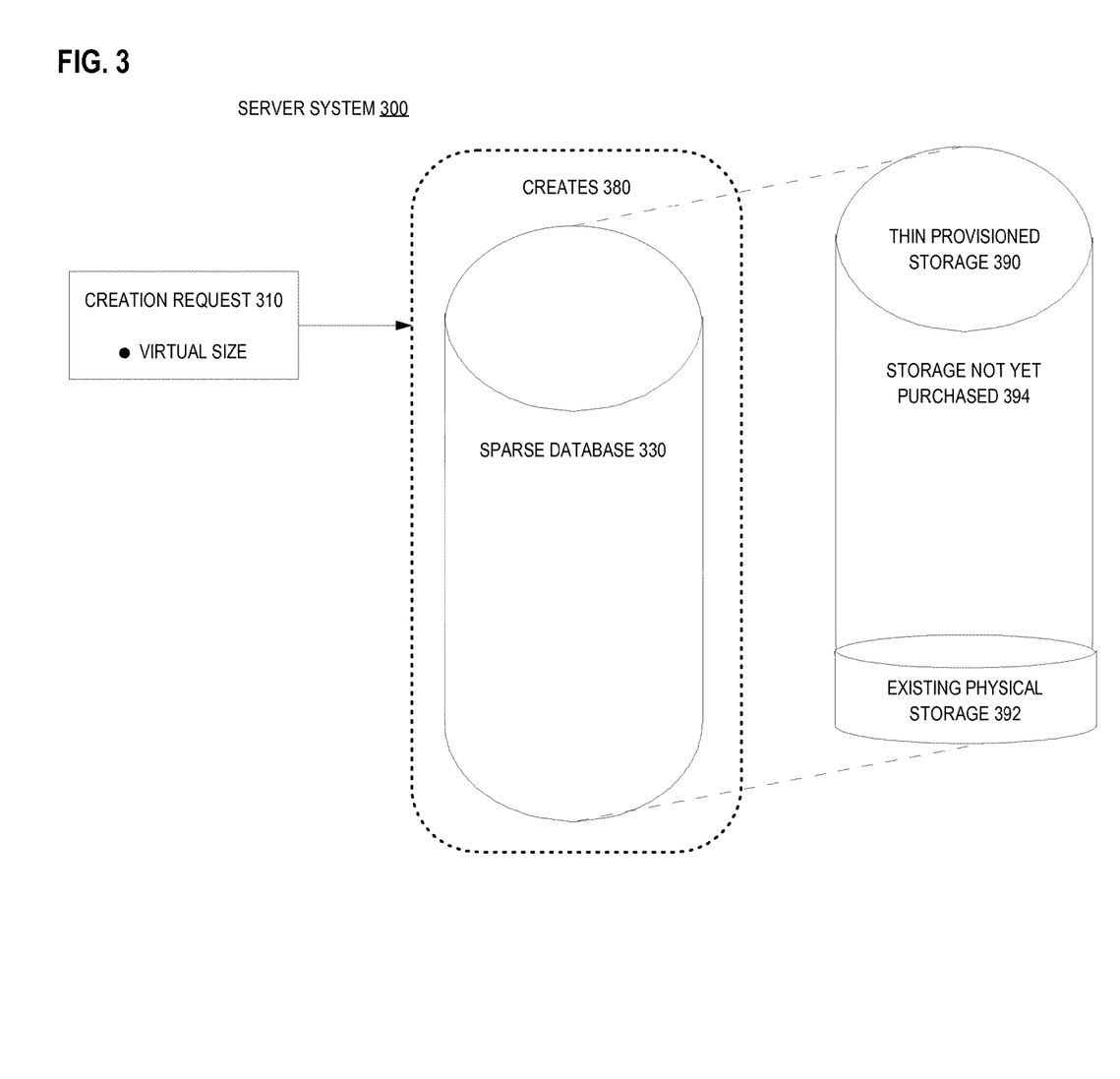
FIG. 3 is a logical block diagram illustrating an example server system in which certain techniques described herein may be implemented, according to various embodiments.

FIG. 3 illustrates a block diagram of example server system 300 that thinly provisions storage, in which techniques described herein may be practiced. Server system 300 exemplifies a virtual size of a sparse database in excess of storage capacity. Server system 300 may be an implementation of database system 100.

Server system 300 initially includes thin provisioned storage 390. Thin provisioned storage 390 uses storage virtualization to manage logical block addresses beyond the physical capacity of the corresponding storage hardware.

Server system 300 receives creation request 310 to create a sparse database as a database snapshot. Creation request 310 bears a virtual size value that specifies how much virtual storage space to reserve for the database snapshot.

Server system 300 processes creation request 310 to create sparse database 330 that is backed by a parent database that is not shown. Sparse database 330 is sized to match the virtual size given in creation request 310.

However because sparse database 330 is initially empty, except for metadata, the physical storage footprint of sparse database 330 is much smaller than the virtual size reserved for sparse database 330 in thin provisioned storage 390. For example, because sparse database 330 initially has only metadata, the storage footprint of the data files of sparse database 330 is small enough to physically fit within existing physical storage 392.

Sparse database 330 may benefit from thin provisioning regardless of whether sparse database 330 is used as a snapshot database or a stand-alone database. In either case, the physical storage footprint is initially much smaller than the virtual size. If sparse database 330 were not sparse, then database creation would involve materializing all blocks within the virtual size and initializing those blocks with an initial data pattern. However because sparse database 330 is sparse, data blocks need not be materialized or initialized with an initial pattern. This results in faster database creation and requiring less initial storage space, regardless of whether sparse database 330 is used as a snapshot database or a stand-alone database.

Over time, the contents of sparse database 330 grow as data naturally accumulates. During such growth, thin provisioned storage 390 dedicates physical blocks from within existing physical storage 392 as needed to materialize sparse blocks and accommodate new data.

When existing physical storage 392 nears exhaustion, server system 300 may issue an alert that warns an administrator to add more disk drives to thin provisioned storage 390. These additional disk drives are eventually used to materialize sparse blocks that occur within the block address range of storage not yet purchased 394. In essence, the administrator may virtually oversize sparse database 330 and then buy and add storage capacity dynamically, in a just in time fashion. This reduces the initial capital cost of creating a database snapshot because capital spending can be deferred until incrementally needed.

5.0 Daisy Chained Sparse Snapshots

Figure 4:
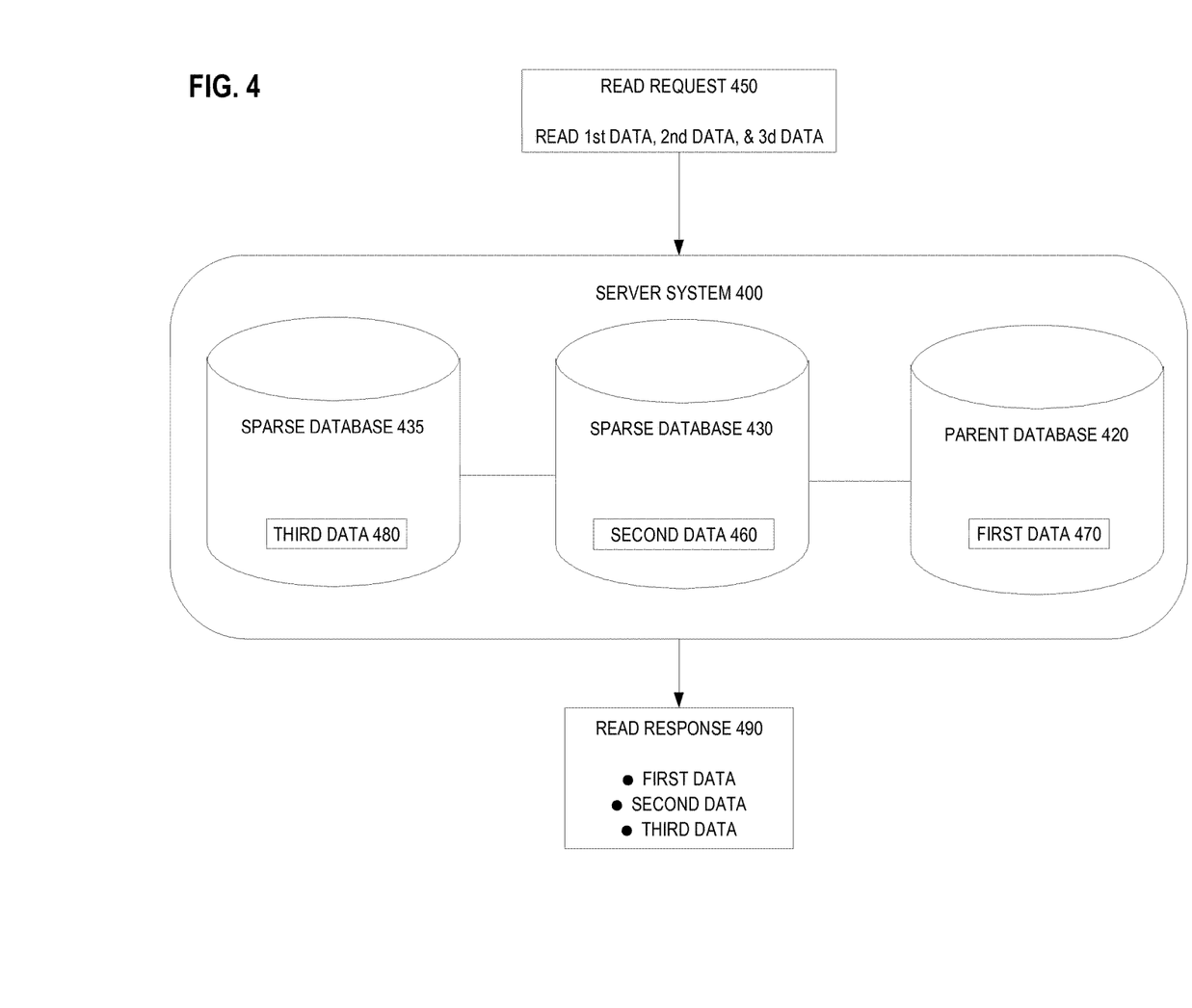
FIG. 4 is a logical block diagram illustrating an example server system in which certain techniques described herein may be implemented, according to various embodiments.

FIG. 4 illustrates a block diagram of example server system 400 that uses a daisy chain of sparse databases that is terminated by a parent database, in which techniques described herein may be practiced. Server system 400 may be an implementation of database system 100.

Server system 400 includes sparse databases 430 and 435 and parent database 420. Although not shown as such, sparse database 430 may be a plurality of sparse databases that are daisy chained snapshots to achieve an arbitrarily long daisy chain. Daisy chaining requires that each sparse database 430 function as both a sparse database and as a parent database.

For example with regards to sparse database 435, server system 400 may treat daisy chained sparse database 430 as a parent database to use for retrieval of first data 470. Likewise with regards to sparse database 430, server system 400 may use parent database 420, which is the end of the daisy chain, as the ultimate source for retrieval of first data 470. Sparse database 435 is the beginning of the daisy chain.

As shown, sparse database 435 receives read request 450 to together read first data 470, second data 460, and third data 480. Read request 450 is processed by retrieving data from sparse databases 430 and 435 and parent database 420. As such, read response 490 contains first data, second data, and third data.

6.0 Shallow Snapshot

Figure 5:
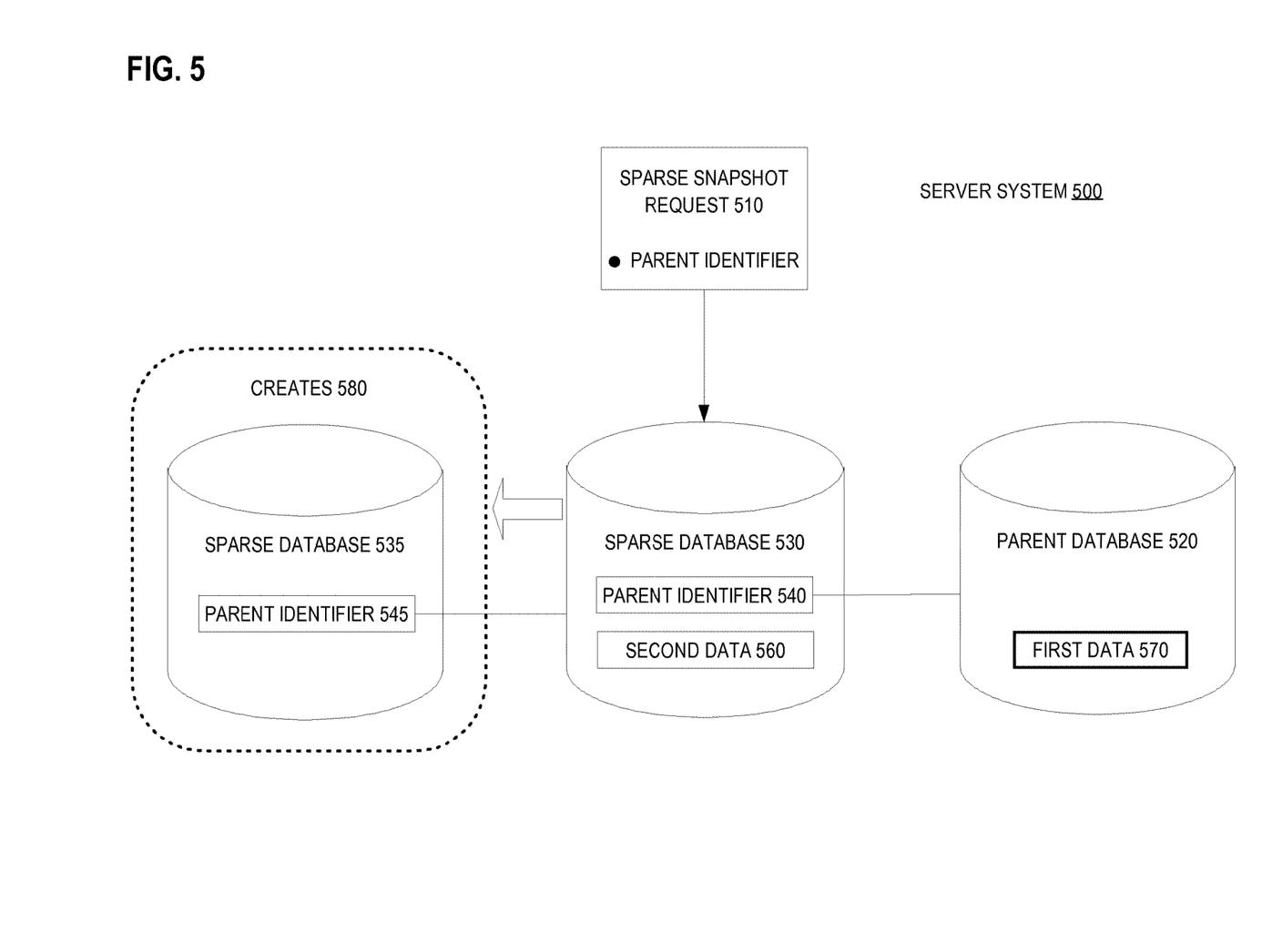
FIG. 5 is a logical block diagram illustrating an example server system in which certain techniques described herein may be implemented, according to various embodiments.
Figure 6:
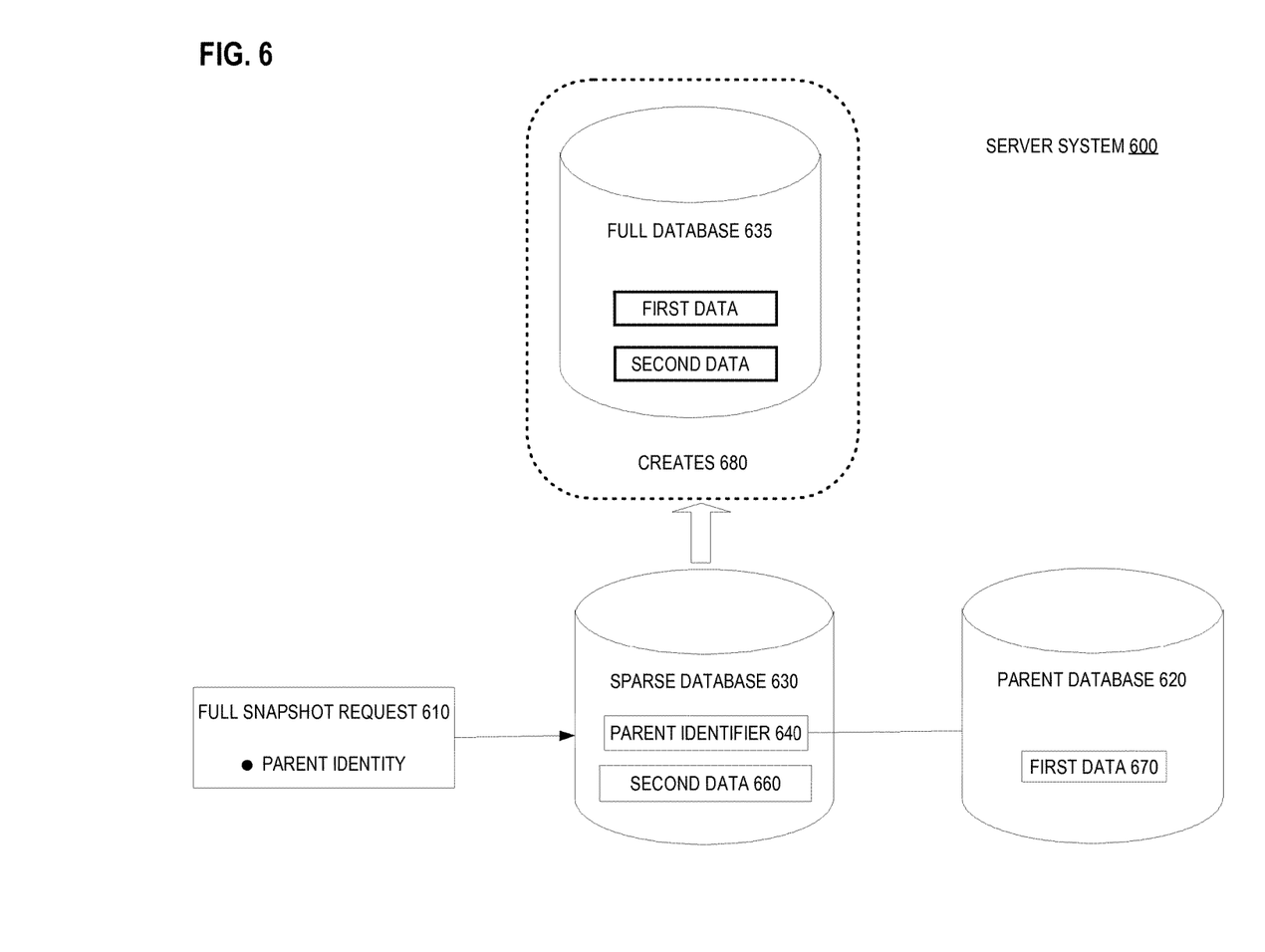
FIG. 6 is a logical block diagram illustrating an example server system in which certain techniques described herein may be implemented, according to various embodiments.

FIGS. 5 and 6 illustrate various copy semantics that may be invoked during snapshot creation. FIG. 5 illustrates a block diagram of example server system 500 that creates a sparse database to rapidly implement a database snapshot, in which techniques described herein may be practiced. Server system 500 may be an implementation of database system 100.

Server system 500 initially includes sparse database 530 and parent database 520. Server system 500 receives sparse snapshot request 510 to create a database snapshot from sparse database 530.

Server system 500 processes sparse snapshot request 510 to create sparse database 535. How sparse database 535 is configured depends on desired copy semantics. FIG. 5 as drawn depicts a daisy chain achieved by a shallow copy.

During the shallow copy of creates 580, sparse database 535 is created as empty, except for metadata that includes parent identifier 545 that identifies sparse database 530 as the parent database of sparse database 535. Daisy chaining is achieved because parent identifier 545 links databases 530 and 535, and parent identifier 540 links databases 520 and 530. As such, parent identifiers 540 and 545 refer to different parent databases and so have different values.

Alternatively and although not shown, create 580 may instead create database 535 as a clone that is copied from sparse database 530. As such, sparse database 535 would not be empty, because sparse database 530 is not empty. Both sparse databases 530 and 535 would contain copies of second data 560. This is an alternative to daisy chaining, such that parent identifiers 540 and 545 would have the same value and both refer to parent database 520. Rather than a daisy chain, databases 520, 530, and 535 would be linked in a star topology, with parent database 520 as the hub and sparse databases 530 and 535 as the spokes.

7.0 Deep Snapshot

FIG. 6 illustrates a block diagram of example server system 600 that creates a standalone full snapshot from a sparse database and its parent database, in which techniques described herein may be practiced. Server system 600 may be an implementation of database system 100.

Server system 600 initially includes sparse database 630 and parent database 620. Server system 600 receives full snapshot request 610 to create a database snapshot with the combined contents of sparse database 630 and parent database 620.

Server system 600 processes full snapshot request 610 to create full database 635 as a deep copy of databases 620 and 630. During the deep copy of creates 680, full database 635 is created as an ordinary database that is not sparse. Into full database 635, server system 600 copies first data 670 from parent database 620 and second data 660 of sparse database 630. A result of the deep copy is that full database 635 contains a merged combination of whatever data resides in databases 620 and 630.

A block is the atomic unit of data in server system 600. Data within a block may evolve over time as updates occur. An update to a non-materialized block in sparse database 630 causes the block to become materialized in sparse database 630 and record the update. As such and after an update to a logical block in sparse database 630, the logical block has two materializations, with a pre-update materialization in parent database 620 and a post-update materialization in sparse database 630.

During the deep copy, both materializations of the same block should not be copied to full database 635. Instead, server system 600 copies only the block as it occurs in sparse database 630. That is, server system 600 copies a block from parent database 620 only when the block does not occur in the sparse database 630. This is a consequence of server system 600 always speculatively reading a block from sparse database 630 before falling back on parent database 620 when needed. This results in full database 635 being a standalone snapshot that has no ongoing dependency upon a parent database because full database 635 has a combined copy of all data.

8.0 Smart Scan of Snapshot

There are storage retrieval optimization techniques that can be used to accelerate a scan of a database snapshot. These techniques may be used regardless of whether the database snapshot is a shallow snapshot or a deep snapshot. As described in U.S. patent application Ser. No. 2014/0281247, entitled Method To Accelerate Queries Using Dynamically Generated Alternate Data Formats In Flash Cache, and related patent applications, a smart scan is an optimized way to scan a table.

Smart scan achieves optimality by taking responsibility for row filtration and column projection away from the database system and pushing that responsibility down into the storage system. The result of this shifting of responsibility is that the storage system can deliver less data to the database system during a table scan. This reduces query latency, avoids database cache thrashing, and conserves network bandwidth.

For block-based storage, this means that the only blocks that a storage system will deliver during a smart scan are those blocks that contain rows that satisfy a row filter. Furthermore if the storage is columnar, then the storage system will only deliver those blocks that contain columns that are projected by the query.

A storage device that supports sparse blocks, such as for a sparse snapshot database with unmaterialized blocks, may sometimes delegate block retrieval to a parent database that has corresponding materialized blocks. Smart scanning may apply block filtration either at the storage device of the snapshot database or, if the filtration criteria can be relayed to the storage device of the parent database, then block filtration may occur at the storage device of the parent database. In either case, only blocks that satisfy the smart scan criteria are delivered to the database system from the storage devices.

Smart scanning may also use a storage index on the storage device. The storage index resides within the memory of the storage device. The storage index functions as a negative index that indicates which data blocks do not have matching data. The storage device may use its storage index to avoid reading data blocks that the storage index indicates do not contain data that matches criteria of a current smart scan.

Figure 7:
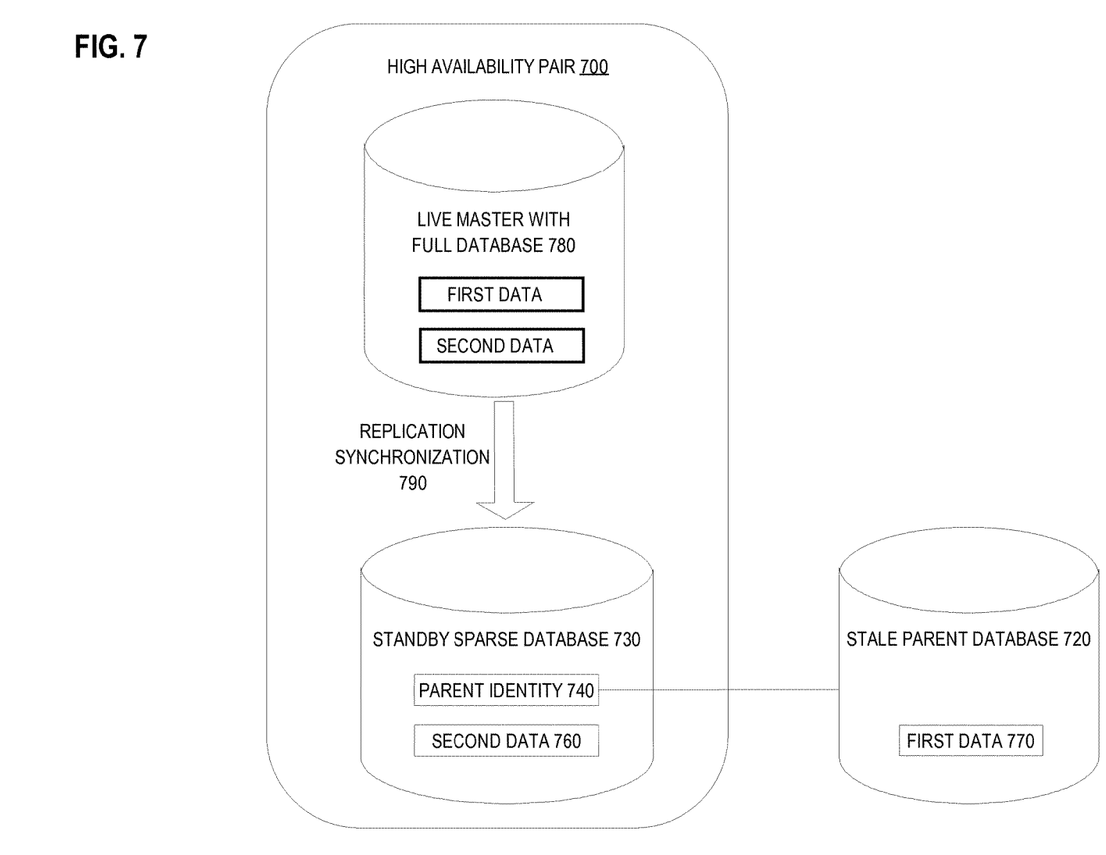
FIG. 7 is a logical block diagram illustrating an example high availability pair in which certain techniques described herein may be implemented, according to various embodiments.

9.0 Live Master Database, Slave on Hot Standby, Replication Synchronization, High Availability Pair, Buddy Failover FIG. 7 illustrates a block diagram of example high availability pair 700 that derives fault tolerance from redundancy, in which techniques described herein may be practiced. Although not shown, high availability pair 700 may provide an OLTP system to an important enterprise application such as an online auction or other market maker. Even a brief outage of the OLTP system would impair revenue. The OLTP system may be an implementation of database system 100.

High availability pair 700 includes live master with full database 780 and standby sparse database 730 arranged as a live master with a replication slave on hot standby. While alive, live master with full database 780 monopolizes all external traffic. While on hot standby, standby sparse database 730 receives no external traffic. Such isolation of external traffic may be achieved by a hardware load balancer or a software proxy.

Live master with full database 780 has a full complement of data that includes first data and second data. However being sparse, standby sparse database 730 lacks a full complement of data. Any data that is missing from standby sparse database 730, such as first data 770, instead resides in stale parent database 720. For data retrieval, the OLTP system may issue a speculative read to standby sparse database 730 and then retry the read on stale parent database 720 if needed. Therefore and although standby sparse database 730 lacks some data, standby sparse database 730 may still function as though it has all of the data.

Under the influence of external commands such as write requests, the contents of live master with full database 780 may evolve. Replication synchronization 790 conducts these data changes from live master with full database 780 to standby sparse database 730. Replication synchronization 790 may tunnel between high availability pair 700 with a socket-based and packet-switched internet protocol (IP) such as transport control protocol (TCP) or user datagram protocol (UDP).

Replication synchronization 790 mutates the contents of standby sparse database 730 to reflect the evolution of live master with full database 780. While on hot standby, standby sparse database 730 has no source of mutation other than replication synchronization 790. However, the impact of replication synchronization 790 is limited to standby sparse database 730.

Even though standby sparse database 730 is backed by stale parent database 720, the content of stale parent database 720 may be treated as if immutable. Replication synchronization 790 does not mutate stale parent database 720. Indeed, stale parent database 720 may be read only. Furthermore, stale parent database 720 may be incarnated from a historical backup. The historical backup may be some days stale. An implementation of stale parent database 720 may be configured to directly use historical backup files as live read-only database files.

An implementation of stale parent database 720 may be switched between alternate historical backups, perhaps necessitating a reboot. Essentially, stale parent database 720 may support pluggable historical backups. For example, stale parent database 720 may be scheduled to undergo a weekly or nightly switch to a fresh historical backup. When stale parent database 720 is switched to a fresh historical backup, the tables of standby sparse database 730 may optionally be truncated, perhaps to reclaim storage space or for other performance reasons.

Inevitably, live master with full database 780 will fail. For example, a load balancer may detect that the heartbeat of live master with full database 780 has stopped. The load balancer diverts all subsequent traffic to standby sparse database 730. The onset of traffic awakens standby sparse database 730 out of standby mode. Standby sparse database 730 is transitioned into live solo mode. Despite this transition, the relationship between standby sparse database 730 and stale parent database 720 is unchanged.

Standby sparse database 730 can continue to be operated in live solo mode indefinitely. However redundancy is lost, and so there is no high availability. Redundancy may be restored by rehabilitating live master with full database 780, which likely entails some database maintenance that may be proportional to the duration that standby sparse database 730 operated in live solo mode as the system of record.

10.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
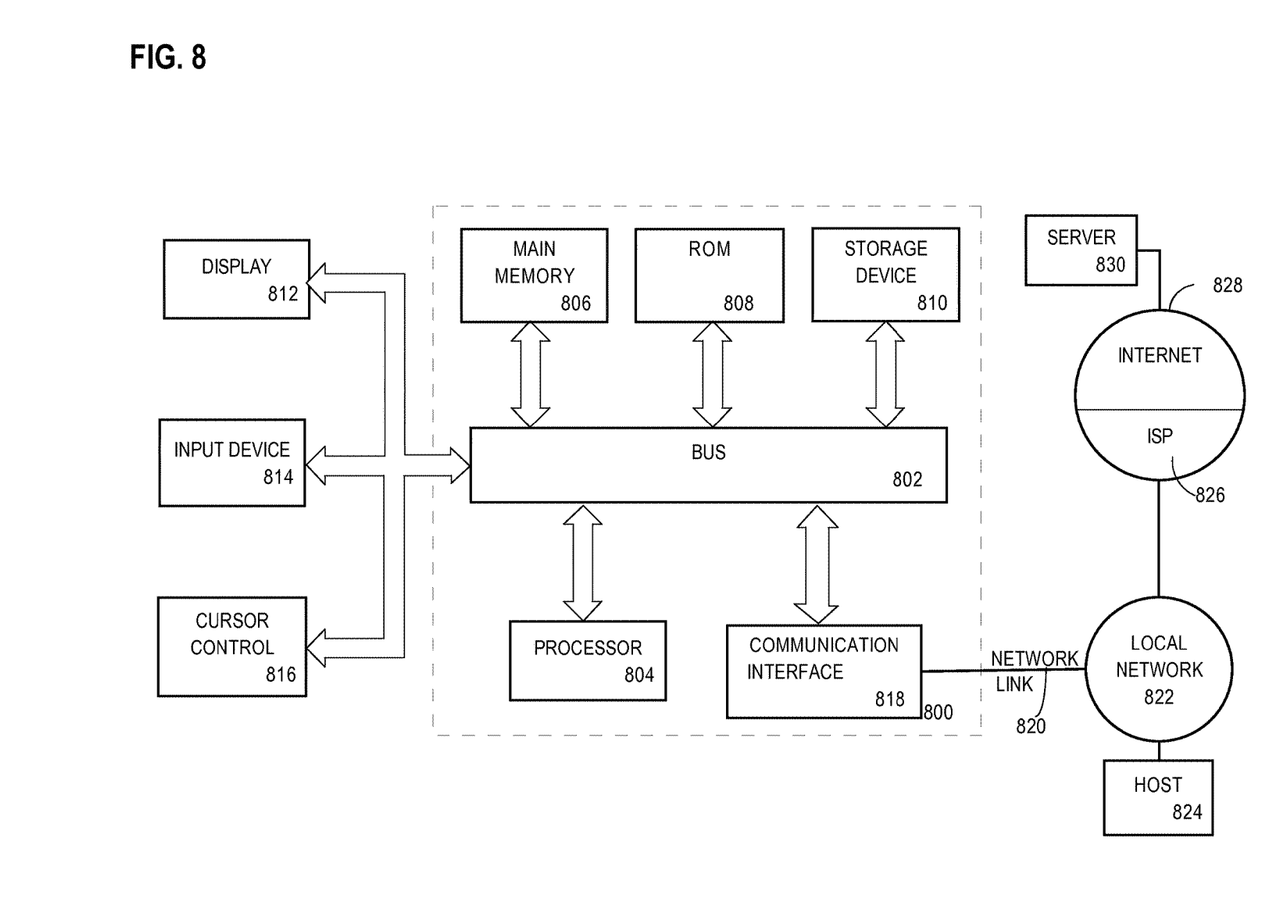
FIG. 8 is a block diagram illustrating one embodiment of a computer system suitable for implementing methods and features described herein.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a light emitting diode (LED) display, for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

11.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a creation request to create a sparse database, wherein the creation request comprises an identity of a parent database;
processing the creation request to create a sparse database, wherein the sparse database does not contain data copied from the parent database, wherein the sparse database comprises one or more sparse files;
processing said identity of said parent database by:
associating said sparse database with said identity of said parent database in a data dictionary of a database system;
receiving a write request to write data into the sparse database;
processing the write request by writing the data into the one or more sparse files of the sparse database, wherein the data is not stored into the parent database;
using said identity of said parent database to access said parent database in fulfilment of a subsequent request to access said sparse database.

2. The method of claim 1 further comprising:
from a client, receiving a read request to read data from the sparse database;
to the client and in fulfilment of the read request, transferring data from the sparse database and data from the parent database.

3. The method of claim 2 wherein the read request specifies a sparse read.

4. The method of claim 1 wherein the write request specifies a sparse write.

5. The method of claim 1 further comprising:
receiving a sparse copy request to copy the sparse database;
processing the sparse copy request by copying the sparse database without copying the parent database.

6. The method of claim 1 further comprising:
receiving a full copy request to copy the sparse database;
processing the full copy request by:
creating a writable database;
merging the sparse database and the parent database into the writable database.

7. The method of claim 1 further comprising:
receiving a second creation request to create a second sparse database, wherein the second creation request comprises the identity of the parent database;
processing the second creation request by creating a second sparse database, wherein the second sparse database comprises the identity of the parent database, wherein the second sparse database does not comprise data from the parent database.

8. The method of claim 1 wherein the creation request comprises a virtual size of the sparse database.

9. The method of claim 8 wherein the sparse database resides on thin provisioned storage.

10. The method of claim 1 further comprising operating the sparse database as a standby replica for a primary database.

11. The method of claim 1 further comprising extracting said identity of said parent database from a data definition language (DDL) command that contains said creation request.

12. The method of claim 1 wherein:
the method further comprises storing said identity of said parent database in said sparse database;
said using said identity of said parent database to access parent database in fulfilment of said subsequent request comprises using said identity of said parent database that is stored in said sparse database.

13. One or more non-transitory computer readable media comprising instructions that when executed by one or more processors cause:
receiving a creation request to create a sparse database, wherein the creation request comprises an identity of a parent database;
processing the creation request to create a sparse database, wherein the sparse database does not contain data copied from the parent database, wherein the sparse database comprises one or more sparse files;
processing said identity of said parent database by:
associating said sparse database with said identity of said parent database in a data dictionary of a database system;
receiving a write request to write data into the sparse database;
processing the write request by writing the data into the one or more sparse files of the sparse database, wherein the data is not stored into the parent database;
using said identity of said parent database to access said parent database in fulfilment of a subsequent request to access said sparse database.

14. The one or more non-transitory computer readable media of claim 13 wherein the instructions further cause:
from a client, receiving a read request to read data from the sparse database;
to the client and in fulfilment of the read request, transferring data from the sparse database and data from the parent database.

15. The one or more non-transitory computer readable media of claim 14 wherein the read request specifies a sparse read.

16. The one or more non-transitory computer readable media of claim 13 wherein the write request specifies a sparse write.

17. The one or more non-transitory computer readable media of claim 13 wherein the instructions further cause:
receiving a sparse copy request to copy the sparse database;
processing the sparse copy request by copying the sparse database without copying the parent database.

18. The one or more non-transitory computer readable media of claim 13 wherein the instructions further cause:
receiving a full copy request to copy the sparse database;
processing the full copy request by:
creating a writable database;
merging the sparse database and the parent database into the writable database.

19. The one or more non-transitory computer readable media of claim 13 wherein the instructions further cause:
receiving a second creation request to create a second sparse database, wherein the second creation request comprises the identity of the parent database;
processing the second creation request by creating a second sparse database, wherein the second sparse database comprises the identity of the parent database, wherein the second sparse database does not comprise data from the parent database.

20. The one or more non-transitory computer readable media of claim 13 wherein the creation request comprises a virtual size of the sparse database.

21. The one or more non-transitory computer readable media of claim 20 wherein the sparse database resides on thin provisioned storage.

22. The one or more non-transitory computer readable media of claim 13 wherein the instructions further cause operating the sparse database as a standby replica for a primary database.

* * * * *